March 9, 1954 M. B. SEYFFERT 2,671,700
AIR BEARING APPARATUS
Filed June 3, 1949 2 Sheets-Sheet 1
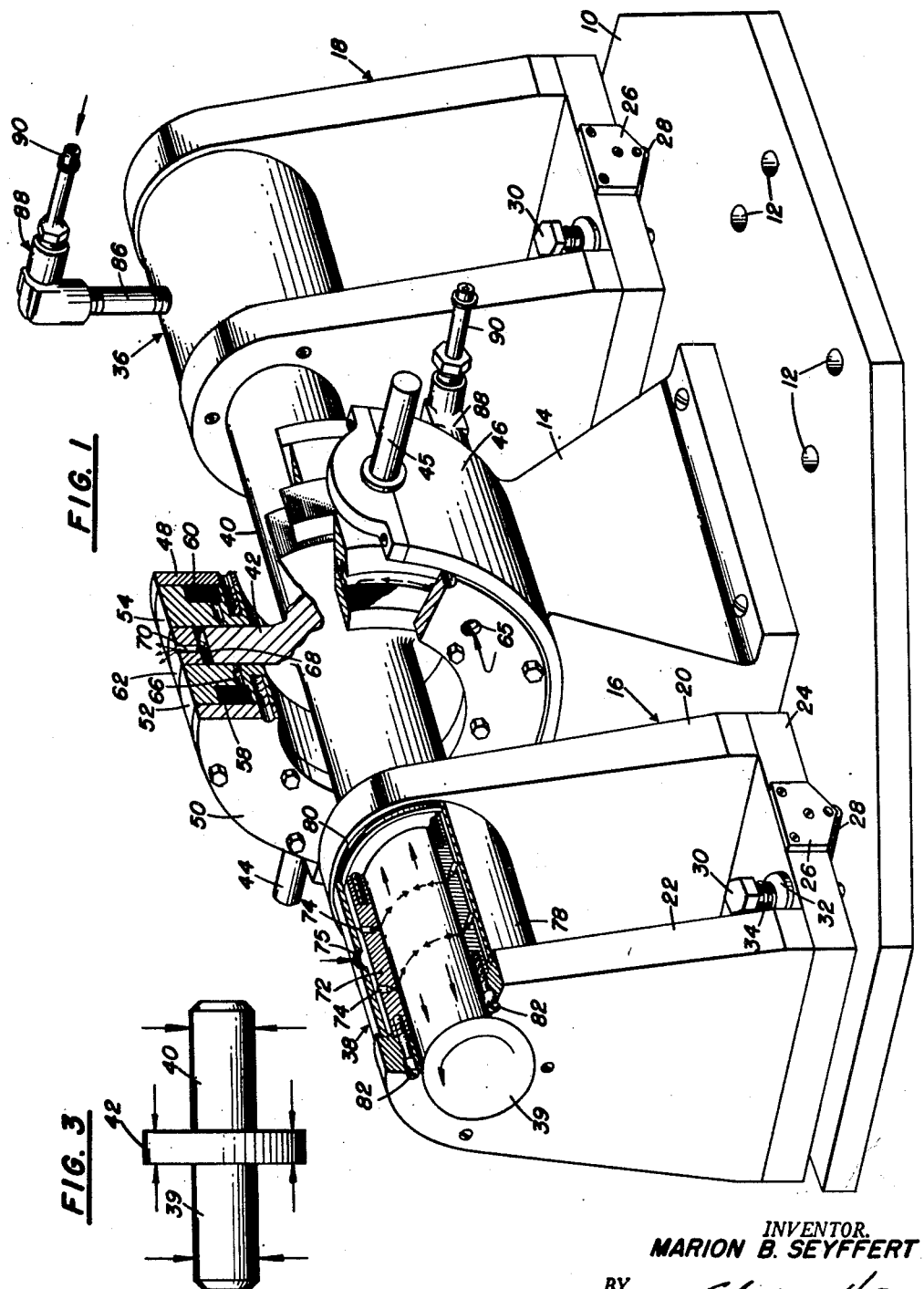
INVENTOR.
MARION B. SEYFFERT
BY
*Attorney*

March 9, 1954 M. B. SEYFFERT 2,671,700
AIR BEARING APPARATUS
Filed June 3, 1949 2 Sheets-Sheet 2
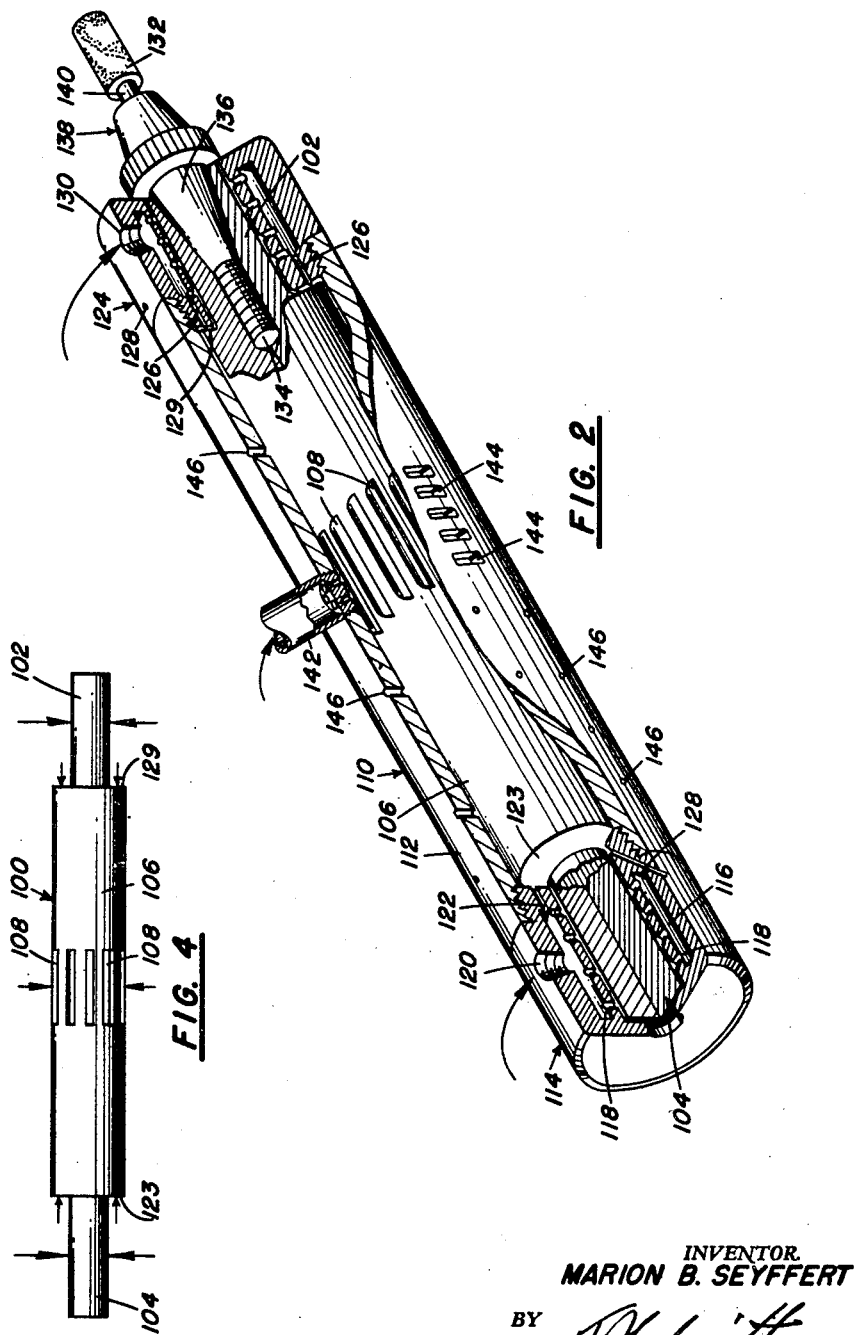
INVENTOR.
MARION B. SEYFFERT

UNITED STATES PATENT OFFICE 2,671,700

AIR BEARING APPARATUS

Marion B. Seyffert, Hampton, Va.

Application June 3, 1949, Serial No. 97,066

10 Claims. (Cl. 308—9)

(Granted under Title 35, U. S. Code (1952), sec. 266)

This invention appertains to novel and useful improvements in devices for use in fine measurements, close tolerance working and the like.

An object of this invention is to minimize friction between two relatively moving elements through the utility of a boundary layer of fluid such as air, interposed between the moving surfaces.

An object of this invention is to obviate the use of any grease and conventional mineral oil lubricants.

Another object of this invention is to render it possible to arrive at more exact computations in use of a conventional dynamometer by reducing friction to a minimum.

A further object of this invention is to provide gas lubrication in rotary and thrust bearings for drills, buffers, polishing, grinding or honing machines which operate at exceedingly high speeds, particularly in connection with any work which requires close tolerances.

Ancillary objects and features of novelty will become apparent to those skilled in the art, in following the description of the preferred forms of the invention, illustrated in the accompanying drawings, wherein:

Fig. 1 is a perspective view of one form of the invention, showing the same utilized in association with testing apparatus;

Fig. 2 is a perspective view of a second form of the invention, showing the same utilized in association with high speed tools;

Fig. 3 is an elevational view of the shaft or rotor of the device shown in Fig. 1 diagrammatically illustrated with force vectors, and;

Fig. 4 is an elevational view of a shaft or rotor of the type illustrated in Fig. 2 showing diagrammatic illustrations of force vectors.

This invention has been developed to provide improved means for reducing the friction between two engaging surfaces which are moving relative to each other. There is a great field of utility for the present invention, two uses of which are illustrated in the accompanying drawings.

Referring first to Figures 1 and 3, there is disclosed a base plate 10 having apertures 12 therein for accommodation of anchoring bolts. This base plate is supplied with a central support 14 which is rigidly secured to said base plate 10.

A pair of identical bracket members generally indicated at 16 and 18 respectively are also supported on the said base plate 10. These bracket members include sides 20 and 22 respectively which are attached to a bottom 24. Said bottom 24 is supplied with brackets 26 having rollers 28 journalled thereon. It is to be noted that the rollers are supplied on the horizontal center line of the bottom 24 and serve the purpose of a roving fulcrum.

Stay bolts 30 extend through enlarged apertures formed in the bottom 24 and covered by suitable washers 32. Means for resiliently biasing the bottom 24 relative to the stay bolts 30 which are anchored to the base 10, is provided. The preferable means as shown may be coil springs 34 one of which is supplied for each stay bolt 30. The springs 34 of course, seat on the washers 32 and react on the undersurface of the heads of the stay bolts 30. By this medium, the support brackets 16 and 18 are floatingly mounted on the base plate 10 and permitted a limited freedom of movement.

A shaft or rotor (see Fig. 3) is journalled in the support 14 and in suitable housings generally indicated at 36 and 38. The last mentioned housings or bearings 36 and 38 are associated with the support brackets 18 and 16 respectively.

The specific structure of the rotor or shaft includes a pair of reduced portions 39 and 40 having an integral enlargement or drum 42 medially thereof.

The said support 14 has an outer arcuate housing plate 46 associated therewith, and the circular end plates 48 and 50 are suspended therein. These end or face plates are fixed against bearing members 52 and 54 respectively, which bearing members have recesses 58 and 60 therein serving the purpose of a manifold. Spacing the bearing members 52 and 54 is a ring 62. This ring 62 is provided with diametrically transverse shafts 44 and 45 rotatably supported in housing plate 46 on support 14.

The drum or enlargement 42 is rotatably received between the said bearing members 52 and 54. It will be noted at this point that no oil or grease lubricant is used between the drum 42 and the said bearing plates 54 and 52. In order to reduce friction between the bearing plates 52 and 54 and the drum 42, a boundary layer of compressed air or other suitable gas is supplied.

This boundary layer of air is supplied by any suitable pump or compressor through the medium of conventional conduits which are attached to inlets 65 which are formed in each end or face plate 48 and 50. The said inlets 65 are in direct communication with the recesses or manifolds 58 and 60 respectively. A plurality of passages or orifices 66 are supplied in the bearing members 52 and 54. As is seen in Figure 1, these passages or orifices consist of a relatively large end in communication with the recesses and then a reduced portion which extends through the material of the plates 52 and 54. A space 68 between the peripheral edge of the drum 42 and the ring 62 is supplied in order to conduct exhaust air therefrom thru opening 70 in the ring 62. By application of air under pressure to the faces of the drum or rotor enlargement 42, this portion of the shaft may be substantially freely floatingly supported in an axial direction. Upon rotation of the shaft, a certain amount of air will escape through the exhaust port 70 formed in the ring 62 and communicating with the atmosphere.

Viewing the housing associated with the support bracket 16 it will be seen that the reduced portion 39 of the shaft is seated in a sleeve 72 having a plurality of orifices or passages 74 radially formed therein. These passages of course direct air against the outer surface of the reduced portion 39 in order to supply a boundary layer of air between the surface of the reduced portion of the shaft and the bore of the sleeve. By this medium, the ends or reduced portions of the said shaft are also freely floatingly supported in radial directions.

An air inlet 75 is formed in the said bearing construction and more specifically in an outer sleeve 78. This outer sleeve 78 bears against a suitable gasket 80 provided in a groove in the inner face of each of the end plates 20 and 22. The said bearing or sleeve 72 is rigidly attached to the said end plates 20 and 22 through the medium of conventional bolts 82. By spacing the outer sleeve 78 and the inner sleeve 72, a manifold is formed. Compressed air is introduced at the inlet 75 and permitted to impinge upon the reduced portion 39 of the said shaft through passages 74. In the operation of the shaft, the boundary layer of air is formed about the exterior surface of the reduced portions 39 and 40 of the shaft thereby lubricating the bearing construction solely through the use of air.

Even though the parts are made to very small tolerances, there will be sufficient clearance between the shaft extremities 39 and 40 and their corresponding bearing surfaces to permit a small amount of exhaust air to seep through the end constructions as indicated by the arrows in Figure 1.

In order to introduce air into the inlet 75 of each bearing construction 36 and 38, a conventional nipple 86 may be threadedly received therein with a fitting 88 attached thereto. Then, a suitable hose fitting 90 is secured to the coupling for receiving an air hose thereon. A similar type of construction may be used in association with the air inlets 65.

Referring now to Figure 4, a rotor shaft of a second form of the invention is illustrated. In this form of the invention, a rotor shaft generally indicated at 100 is supplied with reduced terminal portions 102 and 104 respectively. These reduced terminal portions are of course spaced by a drum or enlargement 106 which is an integral portion of the said shaft 100. In this form of the invention, turbine pockets 108 are formed substantially medially of the enlargement 106 in order to receive compressed air therein in rotating the shaft or rotor within a housing 110.

Said housing 110 includes a sleeve 112 with a bearing member generally indicated at 114 threadedly received at one end thereof. This bearing member 114 has a manifold 116 formed therein and a plurality of openings or passages 118 radially passed thru the inner wall of said manifold. An inlet 120 is formed in the outer wall of said bearing 114 and is adapted to receive a source of compressed air.

It is seen that the reduced or end portion 104 of the said shaft 100 is received within the bearing 114 and the passages 118 are radially disposed therewith. Through this means, the compressed air entering the passage or inlet 120 is directed through the manifold 116 and passages 118 against the outer surface of the reduced portion 104. In the operation of the shaft a boundary layer of air is maintained around it, thereby lubricating the parts while they are moving.

A passage 122 is formed in the said bearing 114 and directs compressed air against the shoulder 123 formed by the enlargement 106. Of course, the opposite end of the sleeve 112 has a substantially similar bearing construction 124 at the opposite end thereof, whereby a similar passage 126 directs air against a shoulder 129 for similar reaction in the opposite direction.

An outlet 128 is supplied in the said bearing 114 (and also in the said bearing 124) in order to conduct exhaust air from the inner corner of said bearing construction adjacent the shoulder 123.

The opposite end of the rotor or shaft has an inlet port 130 similar to the said port 120 and the manifold and port construction is identical. However, formed in this end of said shaft 100 is means for retaining a drilling, abrading, polishing or other type of high speed tool 132. The retaining means may include a threaded shank 134 received in a suitable internally threaded bore in the reduced portion 102 of the said shaft 100 and may also include a frusto-conical element 136 integral with the threaded portion 134 which seats in a suitable complementally shaped opening in the said reduced portion 102 of the shaft. Further, a conventional chuck mechanism 138 may be secured to the said frusto-conical element 136 for retention of the small shaft 140 of the tool 132. Of course, any conventional means may be used for maintaining the abrading tool or the like 132 rigidly secured to the said shaft 100.

In order to supply rotative movement of the shaft 100 within the housing 110 at an extremely high speed, the turbine pockets or buckets 108 are utilized. A compressed air inlet 142 is formed in the said housing 110 and is supplied substantially centrally of the length of the pockets 108. Compressed air is introduced at this point through nozzles the reaction of which against the pockets 108 rotates the shaft. At a short distance from nozzles of the inlet 142 there is supplied a plurality of outlet ports 144 in the sleeve 112 for exhausting the air. In order to further exhaust any air which may escape from the buckets 108, the outlets or passages 146 are formed along the length of the said sleeve 112. Further, it will be seen from inspection of Fig. 2, that some of the air utilized for exerting an air pressure on the shoulders 123 and 129 is relieved through the passages 146. By this construction, the entire shaft or rotor may be suspended on a film or boundary layer of air between the relatively moving surfaces during the rotation of the shaft. (All forces are applied to the rotor or shaft in equal and opposite directions while forcing the air under pressure between the moving parts.) Not only does this air cool the metal, but it also lubricates the same in a sense since the boundary layer thus produced constantly spaces the metal surfaces from each other.

When the invention is utilized in association with the device as illustrated in Fig. 1, friction is reduced in the bearings of the moving elements, thereby rendering (aircraft) test data obtained in equipment of this type more accurate and exact.

When the invention is utilized as is seen in Fig. 2, extremely high speed metal working may be obtained such as in grinding extremely small holes for fuel injection nozzles and the like to exact metering size.

It is apparent that many obvious variations may be made without departing from the spirit and scope of the invention as defined in the appended claims.

The invention described herein may be manufactured and used by or for the Government of the United States of America for governmental purposes without the payment of any royalties thereon or therefor.

Having described the invention what is claimed as new is:

1. In a dynamometer apparatus, a base plate, a support secured to said base plate, a housing and means for pivotally mounting said housing on said support, a shaft having an integral drum journalled in said housing, and means for spacing said drum from said housing, said spacing means including manifolds in said housing, means for communicating said manifolds with the end surfaces of said drum to direct air under pressure to the drum and form a boundary layer of air between the housing and drum and a discharge passage in said housing for relieving a portion of the boundary layer air pressure to the ambient atmosphere.

2. In a device of the character described, a shaft having an enlarged portion with shoulders, means supporting said shaft for free rotation, said means including bearings surrounding said shaft adjacent to said shoulders, each of said bearings having a manifold therein which is communicated with compressed air inlet means and passages in communication with said manifold for distributing air from said manifold radially to the surface of said shaft and axially against the shoulders of said enlargement.

3. In a device of the character described, a base plate, a fixed bearing support thereon, a bearing housing having a pivot mounted in said support, a shaft having an integral collar rotatably mounted in said housing for axial support in a direction normal to said pivot, floating bearing supports for said shaft on opposite sides of said collar, having a transverse roller contact with said base plate, equalizer spring means for biasing said floating bearing supports to maintain roller contact with said base plate and providing limited axial movement of said supports, compressed air manifolds in said housing and floating bearing supports with distributing ports for discharging the compressed air radially to said shaft and axially to the opposite sides of said collar.

4. In a device of the character described, a shaft having an enlarged central portion with an outer periphery and sides joining with concentric reduced portions, a bearing housing for said enlarged portion, compressed air inlet passages into said bearing housing and compressed air outlet passages from said bearing housing, said bearing housing providing a space for compressed air at the sides and about the periphery of the enlarged portion, said space being in communication with the air passages, and said outlet passage being adjacent that portion of the housing which encompasses the sides of the enlarged portion of the shaft, each of said reduced portions having a bearing and means in each bearing for applying air under pressure between the reduced portion of the shaft and the said bearing whereby said shaft is supported for air-floating rotation.

5. For use in a dynamometer, a round smooth surfaced shaft having reduced terminal portions and an enlarged central portion having ends normal to and joined with said reduced terminal portions, means supporting the terminal portions in a radial direction and means supporting the ends of the central portion in a direction axially of said shaft, both said means including a boundary layer of air applied under pressure to the terminal portions of said shaft and to said ends of the central portion whereby said shaft is suspended on said layer of air in all directions of movement.

6. A high speed rotary tool holder comprising housing means having a shaft therein, reduced portions at each end of said shaft with a central enlarged portion provided with shoulders, air inlets in said housing means, air pockets in said housing means and in communication with said air inlets, orifices in said pockets for directing air against said reduced portions to form a boundary layer between said reduced portions and said housing means, additional orifices for directing air against said shoulders to form boundary layers between said shoulders and said housing means, and outlet passages in said housing means for discharging a portion of the boundary layers to the ambient air.

7. In a dynamometer apparatus, a base plate, a support comprising arcuate housing plate and lower support member secured to said base plate, a bearing housing and means for pivotally mounting said bearing housing on said support, said pivot means comprising diametrically transverse disposed shaft members pivotally mounted on said arcuate housing plate, a shaft having an integral drum journalled in said bearing housing, and means for supplying a gaseous medium under pressure in said bearing housing to form a boundary layer of air between the bearing housing and the drum for spacing said drum from said housing, and discharge passages in said bearing housing for relieving a portion of the boundary layer of air to the ambient atmosphere.

8. In a device of the character described, a shaft having an enlarged portion, bearing means for supporting said shaft for free rotation, said bearing means including manifolds located closely adjacent said shaft, compressed air inlets communicating with said manifolds, and passages in said manifolds for distributing air from said manifolds to the surface of said shaft, a portion of said passages being disposed substantially radially relative to said shaft, and a portion of said passages being disposed substantially axially relative to said shaft, said axially disposed passages being located opposite the enlarged portion of said shaft whereby said shaft is supported in all directions by a boundary cushion of air.

9. In a device of the character described, a shaft having an enlarged drum-like central portion with opposite sides joining opposite concentric reduced end portions, bearing housing means for said enlarged drum-like portion, said bearing housing means having compressed air inlet and outlet passages for leading compressed air into and from said bearing housing means, said bearing housing means providing a space between the housing means and the sides of the enlarged drum-like portion of the shaft, said space being in communication with said air inlet and outlet passages, said air outlet passage being adjacent that portion of the bearing housing means surrounding the opposite sides of the enlarged drum-like portion of the shaft, additional bearing means for said opposite reduced end portions of said shaft comprising housing means spaced from said shaft to provide a space between the housing and the shaft, compressed air inlet means connected to and communicataing with said space between the reduced end portions of said shaft and said housing means to supply compressed air to lubricate said shaft and support same in a radial direction, said first bearing housing means supporting said shaft in an axial direction by compressed air supplied to the space between the bearing housing and ends of the enlarged drum-like central portion of said shaft.

10. The combination of claim 6 and means connected to said shaft for transforming energy of air flow to rotative movement of said shaft.

MARION B. SEYFFERT.

References Cited in the file of this patent

UNITED STATES PATENTS

| Number | Name | Date |
|---|---|---|
| 594,462 | Cook | Nov. 30, 1897 |
| 930,851 | De Ferranti | Aug. 10, 1909 |
| 1,906,715 | Penick | Nov. 2, 1933 |
| 2,160,778 | Dall | May 30, 1938 |
| 2,442,202 | Hughes | May 25, 1948 |
| 2,449,297 | Hoffer | Sept. 14, 1948 |

FOREIGN PATENTS

| Number | Country | Date |
|---|---|---|
| 27,455 | Denmark | Apr. 6, 1921 |
| 400,159 | Great Britain | Jan. 12, 1932 |
| 626,268 | Great Britain | July 12, 1949 |